United States Patent [19]

Price, Jr. et al.

[11] Patent Number: 5,080,231
[45] Date of Patent: * Jan. 14, 1992

[54] HOLDER FOR TAPE CARTRIDGES

[75] Inventors: Macy J. Price, Jr., Louisville; Laurence G. Ball, Denver, both of Colo.

[73] Assignee: Engineered Data Products, Inc., Broomfield, Colo.

[*] Notice: The portion of the term of this patent subsequent to Nov. 20, 2007 has been disclaimed.

[21] Appl. No.: 605,940

[22] Filed: Oct. 30, 1990

Related U.S. Application Data

[63] Continuation-in-part of Ser. No. 438,200, Nov. 20, 1989, Pat. No. 4,971,199.

[51] Int. Cl.$^5$ .................................... B65D 85/575
[52] U.S. Cl. ..................... 206/387; 211/40; 312/9
[58] Field of Search ............... 206/307, 309, 387, 425, 206/444; 312/9, 10, 12, 15, 19, 8

[56] References Cited

U.S. PATENT DOCUMENTS

| | | | |
|---|---|---|---|
| 3,666,337 | 5/1972 | Sztorc | 312/10 |
| 3,677,396 | 7/1972 | Staar | 206/387 |
| 3,759,395 | 9/1975 | Juhlin | 312/10 |
| 3,897,885 | 8/1975 | Joyce | 206/387 |
| 4,203,519 | 5/1980 | Fujitaki | 206/387 |
| 4,317,603 | 3/1982 | Pepicelli et al. | 312/9 |
| 4,600,107 | 7/1986 | Price et al. | 312/8 |
| 4,730,735 | 3/1988 | Lechner | 312/8 |
| 4,815,795 | 3/1989 | Accumanno et al. | 312/9 |
| 4,844,564 | 7/1989 | Price, Sr. et al. | 312/12 |
| 4,867,311 | 9/1989 | Metcalf | 206/387 |

Primary Examiner—Jimmy G. Foster
Attorney, Agent, or Firm—Joseph J. Kelly; Bruce G. Klaas

[57] ABSTRACT

A holder for tape cartridges having a plastic housing divided by a partition to form an upper section and a lower section each of which has a plurality of compartments integrally formed therein so that a tape cartridge may be positioned in each of the compartments and be supported on a bottom support surface and separate resilient force applying structures are secured to the housing and located between an upper surface of the compartment and the upper surface of the tape cartridge to apply a resilient force against the tape cartridge to urge the tape cartridge against the bottom support surface to retain the tape cartridge in the compartment and wherein abutment surfaces on the upper and lower sections cooperate with abutment surfaces on the resilient force applying structures to retain the resilient force applying structures in proper position. Also, the compartments are formed by specially shaped partitions to facilitate entry of the tape cartridges therein.

17 Claims, 3 Drawing Sheets

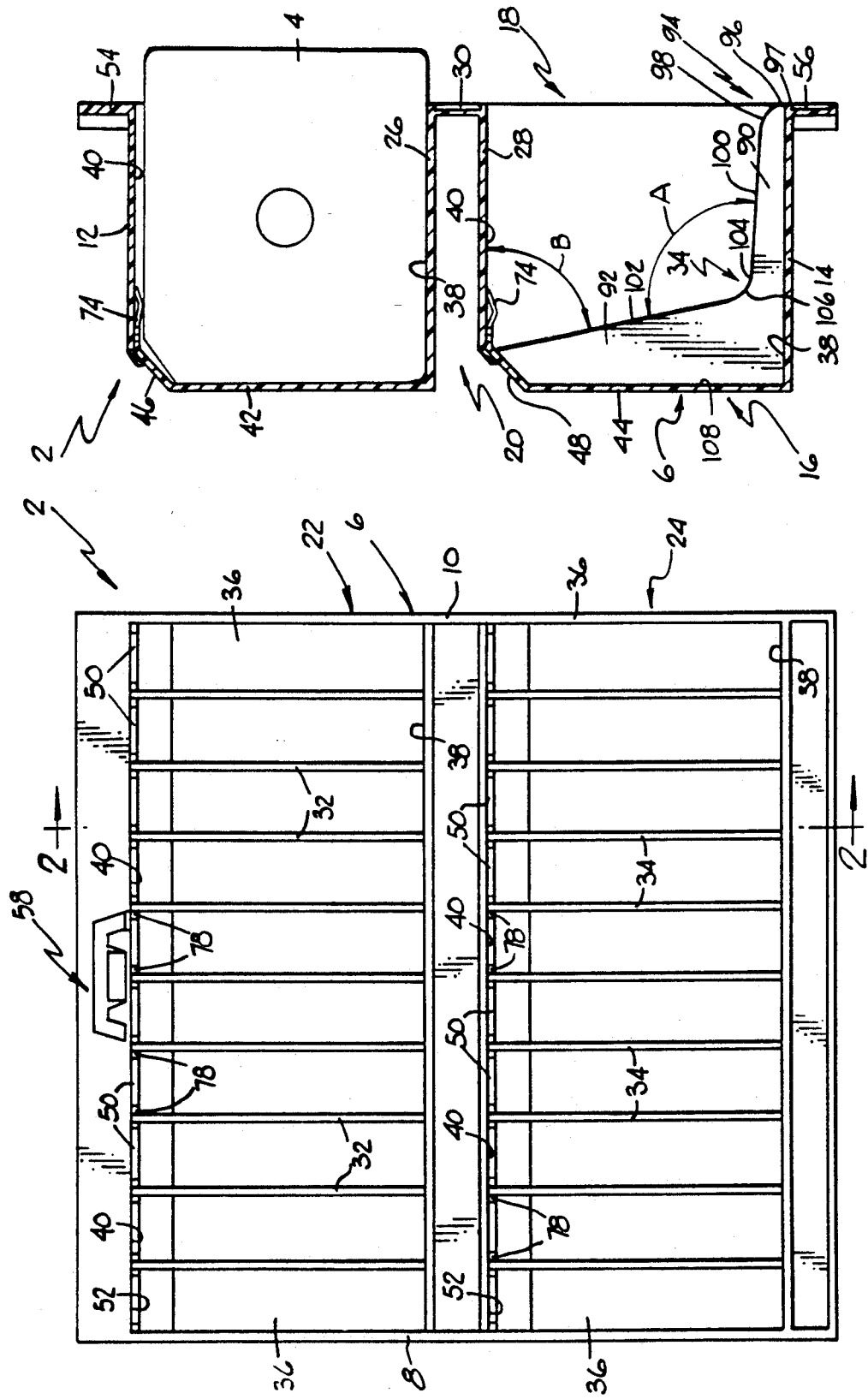

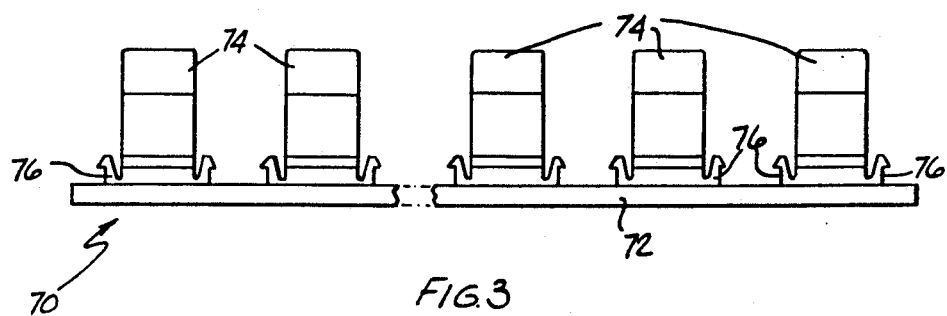
FIG.3
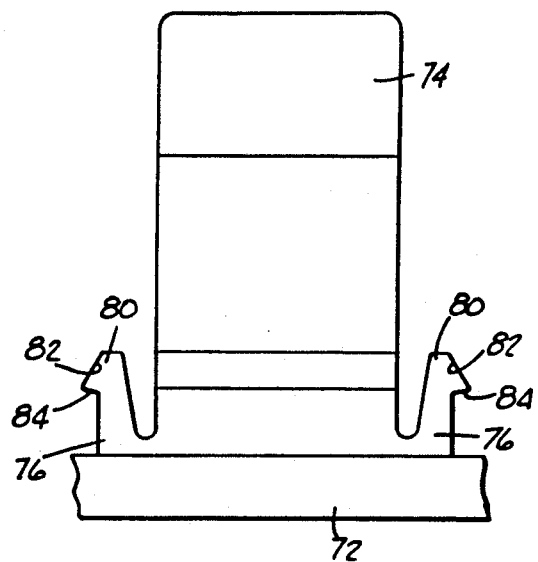
FIG.4
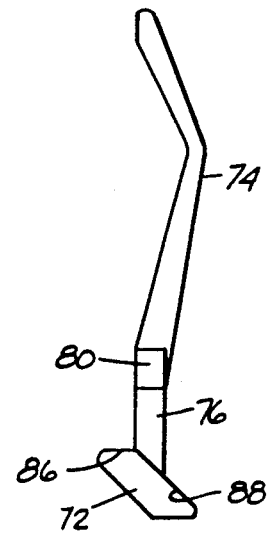
FIG.5
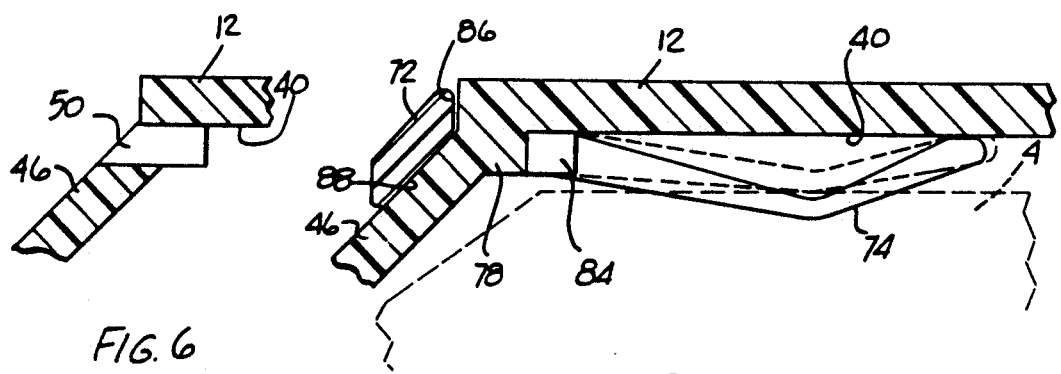
FIG.6
FIG.7

HOLDER FOR TAPE CARTRIDGES

This application is a Continuation-In-Part of U.S. patent application Ser. No. 438,200 filed Nov. 20, 1989, U.S. Pat. No. 4,971,199.

FIELD OF THE INVENTION

The invention relates generally to a holder for tape cartridges that may be used to store or transport tape cartridges and more particularly to a holder for tape cartridges having a plurality of compartments formed therein with each of the compartments holding one tape cartridge and wherein retaining means are provided to retain a tape cartridge in each compartment.

BACKGROUND OF THE INVENTION

There are many types of holders for tape cartridges wherein the holder is provided with compartments each of which is adapted to hold one tape cartridge and wherein resilient means are provided to apply forces to retain the tape cartridge in the compartment. This type of holder is disclosed in U.S. Pat. No. 4,844,564, which is incorporated herein by reference thereto, and in several of the patents of record therein. The holder in the '564 patent utilizes an upwardly extending lip portion to cooperate with resilient means for retaining a tape cartridge in a compartment. While these types of holders function to retain a tape cartridge in a compartment, it is desirable to provide a holder for tape cartridges that retains a tape cartridge in a compartment in a different manner.

BRIEF DESCRIPTION OF THE INVENTION

This invention provides a holder for tap cartridges wherein a housing having an open side in the front portion thereof has a plurality of compartments formed therein, each of which has a generally planar support surface extending into the open side for supporting a tape cartridge and wherein resilient means are provided to urge the tape cartridge in each compartment against the generally planar support surface to retain the tape cartridge in the compartment.

In a preferred embodiment of the invention, the holder for tape cartridges comprises a housing integrally molded using a relatively rigid plastic material and having an open side in the front portion thereof. The housing has a pair of opposite end wall portions, a top wall portion, a bottom wall portion and a back wall portion with partition means extending between an integral with the end wall portions and the back wall portion to divide the housing into an upper section and a lower section. Each of the upper and lower sections have generally planar bottom support surfaces terminating at the open side for supporting tape cartridges and opposite upper surfaces Compartment forming means are in each of the upper and lower sections for forming a plurality of compartments and each compartment is dimensioned to receive one tape cartridge therein Separate force applying means are secured to the back wall portions of the upper and lower sections and extend into each of the compartments to apply a resilient force on one side of a tape cartridge in the compartment to urge the opposite side of the tape cartridge into contact with the support surface of the upper or lower section so as to retain the tape cartridge in the compartment. The separate force applying means comprises an elongated base member extending in a longitudinal direction and having a longitudinal axis. A plurality of resilient tabs are integral with the elongated base member and extend outwardly therefrom in a direction generally perpendicular to the elongated base member. A plurality of resilient retaining means are integral with the elongated base member and extend outwardly therefrom in a direction generally perpendicular thereto and are located so that each of the resilient tabs is located between a pair of the retaining means. The back wall portion has a plurality of openings formed therein with each of the openings having at least one edge thereof defined by the upper surfaces of the upper and lower sections and located so that each opening is aligned with one of the compartments. Spaced apart abutment blocks integral with the back wall portion are located in each of the compartments on opposite sides of each opening to cooperate with the retaining means to secure the separate force applying means on the back wall portion. Each of the retaining means has a terminal end portion with each of the terminal end portions having a tapered surface portion adapted to contact an edge of an opening next adjacent to one of the abutment blocks so that, as the retaining means are moved inwardly through the opening, the retaining means are moved inwardly toward the resilient tab portion. Each of the terminal portions has a hook portion for contacting one of the abutment blocks to secure the separate force applying means on said back wall. The hook portions have tapered surfaces so as to apply a resilient force on the elongated base member to pull it into contact with portions of the back wall portion, the top wall portion and the partition means to hold the resilient tabs in contact with the upper surfaces of each of the compartments.

Each of the partitions forming the compartments for the tape cartridges comprises only a first portion integral with the bottom wall portion and projecting upwardly therefrom and an integral second portion integral with the back wall portion and projecting inwardly therefrom. This construction makes it easier to insert tape cartridges into the compartments.

In another preferred embodiment of the invention, spaced apart abutment blocks, integral with the back wall portion, project inwardly into at least some of the compartments and are located beneath an opening. Preferably, there is an abutment block for each opening. Integral retaining means project downwardly from the bottom surface of at least some of the resilient tabs and are located so as to contact the abutment block. Preferably, each resilient tab has retaining means. Each of the integral retaining means has a hook portion so that, as the resilient tab is pushed through the opening, the hook portion will move over the abutment block and, when it has passed the end of the abutment block, it will be moved downwardly by the resilient tab so that the hook portion will prevent the resilient tab from being withdrawn from the compartment.

BRIEF DESCRIPTION OF THE DRAWINGS

Illustrative and presently preferred embodiments of the invention are shown in the accompanying drawings in which:

FIG. 1 is a front elevational view of the holder;

FIG. 2 is a cross-sectional view taken on the line 2—2 of FIG. 1;

FIG. 3 is a top plan view of the separate resilient force applying means;

FIG. 4 is an enlarged view of a portion of FIG. 3;

FIG. 5 is a side elevational view of FIG. 4;

FIG. 6 is an enlarged cross-sectional view of a portion of the holder;

FIG. 7 is a cross-sectional view illustrating one of the separate force applying means in place in a compartment;

DETAILED DESCRIPTION OF THE INVENTION

Figure 8:
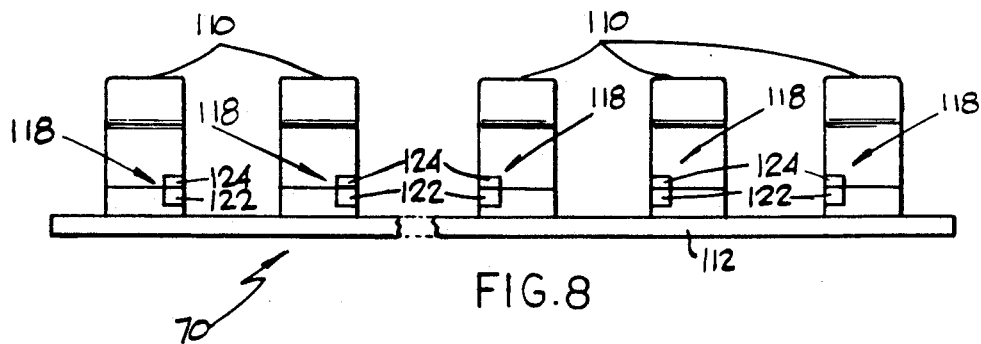
FIG. 8 is a bottom plan view of the separate resilient force applying means.

In FIGS. 1 and 2, there is illustrated a preferred embodiment of the invention which comprises a holder 2 for tape cartridges 4 wherein the holder 2 comprises a housing 6 integrally molded from a relatively rigid plastic material such as high impact polystyrene or other materials having similar characteristics. The housing 6 has opposite end wall portions 8 and 10, a top wall portion 12, a bottom wall portion 14, a back wall portion 16 and an open front side 18. Partition means 20 extend between and are integral with the end wall portions 8 and 10 and are also integral with the back wall portion 16 and divide the housing 2 into an upper section 22 and a lower section 24. The partition means 20 comprise spaced apart panels 26 and 28 connected by an integral panel 30. Compartment forming means comprising partitions 32 in the upper section 22 and partitions 34 in the lower surface 24 cooperate to form a plurality of compartments 36 each of which is dimensioned to receive only one tape cartridge 4. The partitions 32 are integral with the panel 26 and the back wall portion 16 and the partitions 34 are integral with the bottom wall portion 14 and the back wall portion 16. Each compartment 36 has a generally planar surface 38 for supporting a tape cartridge 4 and which terminates at the open front side 18. Each compartment 34 has a generally planar upper surface 40. The back wall portion 16 comprises two spaced apart sections 42 and 44 and a first inclined section 46 extending between and integral with the back wall section 42 and the top wall portion 12 and a second inclined section 48 extending between and integral with the back wall section 44 and the panel 28. A plurality of openings 50 are formed in the first and second inclined sections 46 and 48 for purposes described below. Each opening 50 has one edge portion 52 defined by the upper surface 40. The housing 2 has an upper flange portion 54, a lower flange portion 56 and locking means 58. Each of the openings 50 is aligned with one of the compartments 36.

Separate resilient force applying means 70, FIG. 3, are provided for applying a force on each tape cartridge 4 in a compartment 36, described more fully below. The separate resilient force applying means 70 are integrally molded from a plastic material that is more rigid than the high impact polystyrene of the housing 2 and has a relatively high fatigue resistance such as crystalline thermoplastic homopolymers made by the polymerization of formaldehyde as marketed by DuPont under the designation Delrin 500 or other materials having similar characteristics.

The separate resilient force applying means 70 comprises an elongated base member 72 extending in a longitudinal direction and having a longitudinal axis. A plurality of resilient tabs 74 are integral with the elongated base member 72 and extend outwardly therefrom in a direction generally perpendicular thereto. A plurality of resilient retaining means 76 are integral with the elongated base member 72 and extend outwardly therefrom in a direction generally perpendicular thereto and corresponding to the direction of the resilient tabs 74. The resilient retaining means 76 are located so that each resilient tab 74 is located between pairs of the resilient retaining means 76.

Spaced apart abutment blocks 78, FIGS. 1 and 7, are located on opposite sides of each opening 50. The abutment blocks 78 in the upper section 22 are integral with the first inclined section 46 and the top wall portion 12 and the abutment blocks 78 in the lower section 24 are integral with the second inclined section 48 and the panel 28. Each of the retaining means 76 has a terminal end portion 80 having a tapered surface portion 82 so that, as the retaining means 76 are pushed through an opening 50, the terminal end portions 80 will be moved inwardly toward the resilient tab 74. The terminal end portion 80 also has a hook portion 84 having an inclined surface so that, when the hook portion 84 has passed the abutment blocks 78, the terminal end portion 80 will resile outwardly and move into contact with an abutment block 78. The elongated base member 72 has a first outer surface portion 86 and a second outer surface portion 88. The resilient retaining means 76 therefore exert a resilient force on the elongated base member 72 so that the first outer surface 86 is pulled into contact with the end surface of either the top wall portion 12 or the panel 28 and the second outer surface portion 88 is pulled into contact with portions of the first or second inclined sections 46 and 48. When the separate resilient force applying means 70 have been secured, the resilient tab 74 will extend into each compartment 36 and be in contact with a portion of the upper surface 40.

The operation of the holder 2 is illustrated in FIG. 7. The resilient tab 74 is normally in the position indicated by the solid outline. When a tape cartridge 4 is inserted, the resilient tab 74 will be moved to the position indicated by the dashed outline and in such position will apply a force on the tape cartridge urging it into contact with the planar support surface 38 to retain the tape cartridge 4 in the compartment 36

The shape of the partitions 32 and 34 is illustrated in FIG. 2 wherein the partition 34 has only a first portion 90 integral with the bottom wall portion 14 and projecting upwardly therefrom and an integral second portion 92 integral with the back wall portion 16 and projecting inwardly therefrom. The leading edge 94 has a linearly extending edge portion 96 extending upwardly from the front edge portion 97 of the bottom wall portion 14 for a distance between about 0.20 and 0.30 inch and preferably about 0.25 inch and an arcuate edge portion 98 having a radius of between about 0.24 and 0.36 inch and preferably about 0.25 inch and an upper edge portion 100 which is inclined relative to the bottom wall portion 14 at an angle between about 5.0 and 6.0 degrees and preferably about 5.5 degrees. The second portion 92 has a leading edge portion 102 that has an angular relationship A with the upper edge portion 100 of between about 105 and 110 degrees and preferably of about 108.67 degrees and an angular relationship B with the planar upper surface 40 of between about 75 and 78 degrees and preferably of about 77.84 degrees. The upper edge portion 100 and the leading edge portion 102 are joined by an arcuate edge portion 104 having an radius of about 0.25 inch. The center 106 of the arcuate edge portion 104 is spaced a distance from the junction of the linearly extending portion 96 and the generally planar surface 38 of between about 2.6 and 2.75 inches and preferably about 2.7 inches and upwardly from the generally planar surface 38 a distance of between about 0.75 and 0.77 inch and preferably about 0.76 inch. The center 106 of arcuate edge 104 is located a distance of between about 1.35 and 1.60 inch from the inner surface 108 and preferably about 1.50 inch. This construction provides a good entrance portion and a good guiding portion so that there is no tendency for the tape cartridge to be snagged during its insertion into the compartment 36. Since there is no portion depending from the planar upper surface 40, there is no obstacle for the tape cartridge to hit, if it is slightly tilted during the insertion thereof.

Figures 9, 10:
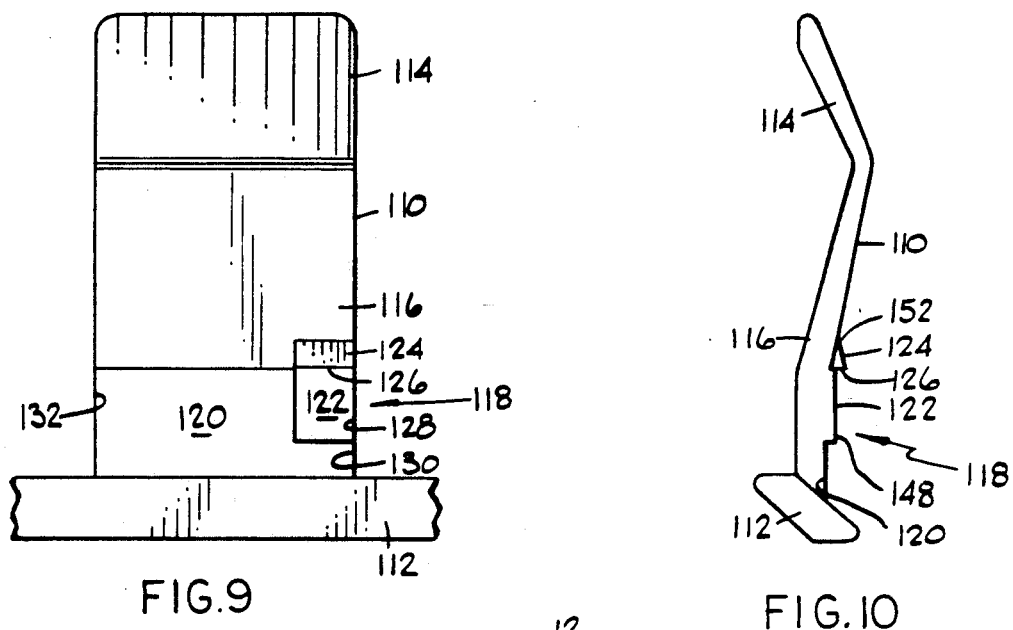
FIG. 9 is an enlarged view of a portion of FIG. 8.
FIG. 10 is a side elevational view of FIG. 9.

Another preferred embodiment of the separate resilient force applying means 70 is illustrated in FIGS. 8-13. A plurality of resilient tabs 110 are integral with an elongated base member 112 which has a longitudinal axis. The resilient tabs 110 extend outwardly from the elongated base member 112 in a direction generally perpendicular thereto. Each resilient tab has two integral leg portions 114 and 116 having an angular relationship. The separate resilient force applying means 70 is integrally molded using a plastic material having a high fatigue resistance such as crystalline thermoplastic homopolymers made by the polymerization of formaldehyde marketed by DuPont under the designation Delrin. This material will deform when subjected to sufficient force and then resile back to its original shape when the force is removed. Integral abutment means 118 project downwardly from the bottom surface 120 of each resilient tab 110. In the preferred embodiment of the invention, each resilient tab 110 is provided with abutment means 118, but it is only necessary to provide at least one of the resilient tabs 110 with abutment means 118. The abutment means 118 comprise a body portion 122 and a hook portion 124 having an abutment surface 126. As illustrated in FIG. 9, the integral abutment means 118 have an edge portion 128 which is in the same plane as the edge portion 130 of the resilient tab 110. Also, the abutment means 118 extend for a distance which is about one-fourth of the distance between the edge portion 130 and the other edge portion 132. As illustrated in FIG. 8, the abutment means 118 are on the side of the resilient tab 110 facing the centerline of the resilient force applying means 70.

Figure 13:
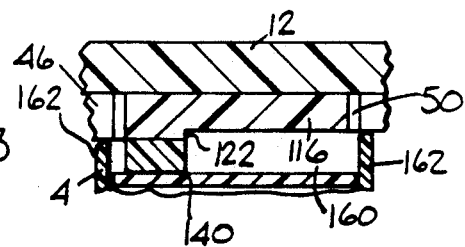
FIG. 13 is a cross-sectional view taken on the line 13—13 of FIG. 12.
Figures 11, 12:
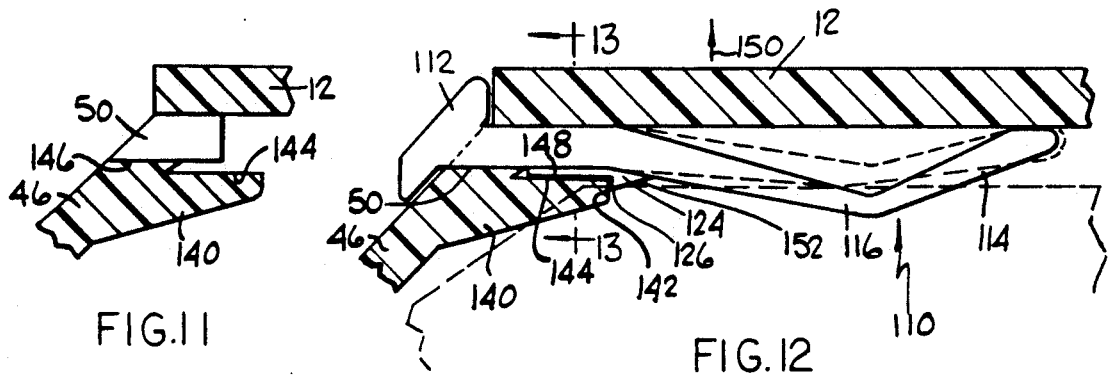
FIG. 11 is an enlarged cross-sectional view of a portion of the holder.
FIG. 12 is a cross-sectional view illustrating one of the separate resilient force applying means in a compartment.

Spaced apart abutment blocks 140 are integral with the sections 42 and 44 and project inwardly into each compartment 36. In the preferred embodiment of the invention, an abutment block 140 is located beneath each opening 50, but it is only necessary to have the same number of abutment blocks 140 as there are abutment means 118. Each abutment block 140 is located beneath at least a portion of each opening 50 so that it can be contacted by the abutment means 118. As illustrated in FIG. 13, the abutment block 140 has a width substantially equal to the width of the body portion 122. Each abutment block 140 has an abutment surface 142 which is contacted by the abutment surface 126 to prevent removal of the resilient tabs 110 after they have been fully moved into the compartments 36. Also, the abutment surfaces 126 and 142 hold the resilient tab 110 in position when it is contacted by a tape cartridge 4 when the tape cartridge 4 is being inserted into a compartment. As illustrated in FIG. 13, a portion of the abutment block 140 and the body portion 122 are located in a recess 160 between the sidewalls 162 of the tape cartridge 4. The abutment block 140 has a generally planar surface 144 which is located below and spaced from the generally planar surface 146 of the opening 50. The body portion 122 has a generally planar surface 148 which contacts the generally planar surface 144. As illustrated in FIG. 12, the thickness, in vertical direction 150, of the hook portion 124 and the leg portion 116 is greater than the thickness, in the vertical direction 150, of the opening 50. The hook portion 124 has a tapering surface 152 so that when the resilient tabs 110 are inserted through the openings 50 and moved into the compartments 36 and a force is applied on the elongated base member 112, the hook portion 124 and the body portion 122 will deform so that they can move through the opening 50. When the resilient tabs 110 are fully inserted, the hook portion 124 and the body portion 122 will resile back to their original shape so that surfaces 144 and 148 are in a contacting relationship and abutment surface 126 is opposite to abutment surface 142.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:
1. A holder for tape cartridges comprising:
an integrally molded plastic housing having an open side in the front portion thereof;
said housing having at least a pair of opposite end wall portion, a top wall portion, a bottom wall portion and a back wall portion;
said bottom wall portion providing a support surface for supporting a tape cartridge;
compartment forming partitions for forming a plurality of compartments in said housing;
each of said compartment forming partitions comprising only a first portion integral with said bottom wall portion and extending upwardly therefrom and an integral second portion integral with said back wall portion and extending inwardly therefrom;
said bottom wall portion having a length and a width;
said back wall portion having a length extending for a distance equal to said length of said bottom wall portion and a height;
said first portion extending for substantially the entire distance of said width;
said second portion extending for substantially the entire distance of said height;
said first portion having an upper edge portion with the major portion thereof extending in a linear direction; and
said second portion having a leading edge portion with the major portion thereof extending in a linear direction that has an obtuse angular relationship with said major portion of said upper edge portion that is less than 110 degrees.

2. The invention as in claim 1 and further comprising:
said bottom wall portion having a front edge portion;
said first portion having a leading edge portion; and at least a portion of said leading edge portion lying in the same vertical plane as said front edge portion of said bottom wall portion.

3. The invention as in claim 1 and further comprising:
partition forming means integral with at least said pair of opposite end wall portions and dividing said housing into an upper section and a lower section;
said partition forming means providing a support surface for supporting a tape cartridge; and
said compartment forming partitions being located in each of said upper and lower sections for forming a plurality of compartments in each of said upper and lower sections.

4. The invention as in claim 3 and further comprising:
said bottom wall portion having a front edge portion;
said first portion having a leading edge portion; and
at least a portion of said leading edge portion lying in the same vertical plane as said front edge portion of said bottom wall portion.

5. The invention as in claim 4 and further comprising:
a front edge portion depending downwardly from said support surface of said partition forming means;
said first portion of said compartment forming means in said upper section having a leading edge portion; and
at least a portion of said leading edge portion lying in the same vertical plane as said front edge portion of said partition forming means.

6. The invention as in claim 3 wherein:
said first portion extends upwardly from said support surface for a distance less than about 0.77 inch; and
said second portion extends inwardly from said back wall portion for a distance less than about 1.50 inch.

7. The invention as in claim 1 wherein:
said obtuse angular relationship is between about 110 and 105 degrees.

8. A holder for tape cartridges comprising:
an integrally molded plastic housing having an open side in the front portion thereof;
said housing having at least a pair of opposite end wall portions, a top wall portion, a bottom wall portion and a back wall portion;
said back wall portion having a plurality of spaced apart openings formed therein;
said bottom wall portion providing a support surface for supporting a tape cartridge;
said top wall portion having an inner surface opposite to said support surface;
compartment forming partitions for forming a plurality of compartments in said housing;
resilient force applying means located in each of said compartments so that, when a tape cartridge is inserted into a compartment, a portion of said resilient force applying means is located between said tape cartridge and a portion of said inner surface to urge said tape cartridge against said support surface to retain said tape cartridge in said compartment;
said resilient force applying means comprising an elongated base member having a plurality of resilient tabs integral therewith;
said resilient tabs passing through said plurality of spaced apart openings into said compartments;
retaining means for retaining said resilient force applying means in said compartments; and
said retaining means comprising at least one abutment surface on said back wall portion of at least one of said compartments and at least one abutment means integral with at least one of said resilient tabs for contacting said abutment surface.

9. The invention as in claim 8 and further comprising:
a plurality of abutment blocks on said back wall portion;
at least one of said abutment blocks located in each of said compartments;
each of said abutment blocks having said abutment surface formed thereon; and
each of said resilient tabs having said abutment means located thereon.

10. The invention as in claim 8 and further comprising:
at least one abutment block no said back wall portion and having said abutment surface formed thereon;
said abutment block being integral with said back wall portion and located below at least one of said openings;
each of said resilient tabs having an upper surface and a lower surface; and
said abutment means integral with and projecting downwardly from said lower surface.

11. The invention as in claim 10 and further comprising:
each of said resilient tabs having a central body portion comprising two leg portions at an angular relationship for providing said resiliency;
at least one of said leg portions of each of said resilient tabs having a thickness in a vertical direction substantially equal to the thickness of each of said openings in said vertical direction;
said at least one of said leg portions and said abutment means having a thickness in a vertical direction greater than the thickness of each of said openings in said vertical direction; and
said resilient tabs being formed form a material capable of deforming when a sufficient force is applied thereto and resiling back to its original shape when said force is removed.

12. The invention as in claim 11 wherein:
said abutment means having a tapered surface so that said deforming force may be gradually applied thereto.

13. A holder for tape cartridges comprising:
a housing integrally molded using a relatively rigid plastic material and having an open side in the front portion thereof;
said housing having a pair of opposite end wall portions, a top wall portion and a bottom wall portion;
partition means extending between and integral with said pair of opposite end wall portions and dividing said housing into an upper section and a lower section;
each of said upper and lower sections having a support surface on which tape cartridges may be supported and an opposite upper surface;
a back wall portion integral with said opposite end wall portions, said top wall portion, said bottom wall portion and said partition means;
said back wall portion having a plurality of spaced apart openings formed therein;
compartment forming partitions in each of said upper and lower sections for forming a plurality of compartments, each of said compartments having dimensions adapted to receive one tape cartridge therein;

first resilient force applying means located in each of said compartments so that, when a tape cartridge is inserted into said compartment, a portion of said first resilient force applying means is located between said tape cartridge in one of said compartments and a portion of said upper surface of said upper section to urge said tape cartridge against said support surface of said upper section to retain said tape cartridge in said compartment;

second resilient force applying means located in each of said compartments so that, when a tape cartridge is inserted into said compartment, a portion of said second resilient force applying means is located between said tape cartridge in one of said compartments and a portion of said upper surface of said lower section to urge said tape cartridge against said support surface of said lower section to retain said tape cartridge in said compartment;

each of said first and second resilient force applying means comprising an elongated base member having a plurality of resilient tabs integral therewith;

said resilient tabs passing through said plurality of spaced apart opening into said compartments;

retaining means for retaining each of said first and second force applying means on said back wall portion; and said retaining means comprising at least one abutment surface on said back wall portion of at least one of said compartments and at least one abutment means integral with at least one of said resilient tabs for contacting said abutment surface.

14. The invention as in claim 13 and further comprising:

a plurality of abutment blocks on said back wall portion;

at least one of said abutments blocks located in each of said compartments;

each of said abutment blocks having said abutment surface formed thereon; and each of said resilient tabs having said abutment means located thereon.

15. The invention as in claim 13 and further comprising:

at least one abutment block on said back wall portion and having said abutment surface formed thereon;

said at least one abutment block being integral with said back wall portion and located below at least one of said openings;

each of said resilient tabs having an upper surface and a lower surface; and said at least one abutment means integral with and projecting downwardly from said lower surface.

16. The invention as in claim 15 and further comprising:

each of said resilient tabs having a central body portion comprising two leg portions at an angular relationship for providing said resiliency;

at least one of said leg portions of each of said resilient tabs having a thickness in a vertical direction substantially equal to the thickness of each of said openings in said vertical direction;

said at least one of said leg portions and said abutment means having a thickness in a vertical direction greater than the thickness of each of said openings in said vertical direction; and said resilient tabs being formed from a material capable to deforming when a sufficient force is applied thereto and resiling back to its original shape when said force is removed.

17. The invention as in claim 16 wherein:

said abutment means having a tapered surface so that said deforming force may be gradually applied thereto.

* * * * *